(12) United States Patent
Kipke et al.

(10) Patent No.: US 8,039,569 B2
(45) Date of Patent: *Oct. 18, 2011

(54) POLYETHYLENE MOLDING COMPOSITIONS FOR INJECTION MOLDING APPLICATIONS

(75) Inventors: Jennifer Kipke, Franfurt (DE); Shahram Mihan, Bad Soden (DE); Rainer Karer, Kaiserslautern (DE)

(73) Assignee: Basell Polyolefine GmbH, Wesseling (DE)

( * ) Notice: Subject to any disclaimer, the term of this patent is extended or adjusted under 35 U.S.C. 154(b) by 357 days.

This patent is subject to a terminal disclaimer.

(21) Appl. No.: 11/919,191

(22) PCT Filed: Apr. 15, 2006

(86) PCT No.: PCT/EP2006/003475
§ 371 (c)(1),
(2), (4) Date: Oct. 24, 2007

(87) PCT Pub. No.: WO2006/114210
PCT Pub. Date: Nov. 2, 2006

(65) Prior Publication Data
US 2009/0306324 A1 Dec. 10, 2009

Related U.S. Application Data

(60) Provisional application No. 60/685,176, filed on May 27, 2005.

(30) Foreign Application Priority Data

Apr. 25, 2005 (DE) .......................... 10 2005 019 393

(51) Int. Cl.
C08F 10/02 (2006.01)
C08F 4/64 (2006.01)

(52) U.S. Cl. ..................... 526/348; 526/348.6; 526/352; 526/113; 526/114; 526/118; 526/119; 525/240

(58) Field of Classification Search .................. 526/113, 526/114, 118, 119, 348, 348.6, 352; 525/240
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 3,872,217 A | 3/1975 | Merz et al. | |
| 4,037,042 A | 7/1977 | Mueller-Tamm et al. | |
| 4,173,548 A | 11/1979 | Pullukat et al. | |
| 4,194,074 A | 3/1980 | Pullukat et al. | |
| 4,284,527 A | 8/1981 | Pullukat et al. | |
| 4,326,639 A * | 4/1982 | Stahl et al. .................... | 215/252 |
| 4,577,768 A | 3/1986 | Go et al. | |
| 4,814,308 A | 3/1989 | Konrad et al. | |
| 5,455,216 A | 10/1995 | Mueller et al. | |
| 5,486,575 A | 1/1996 | Shroff | |
| 5,625,013 A | 4/1997 | Mueller et al. | |
| 5,698,642 A | 12/1997 | Govoni et al. | |
| 5,908,679 A | 6/1999 | Berthold et al. | |
| 6,143,854 A * | 11/2000 | Bamberger et al. ......... | 526/348.1 |
| 6,180,731 B1 | 1/2001 | Rohde et al. | |
| 6,413,477 B1 | 7/2002 | Govoni et al. | |
| 6,417,302 B1 | 7/2002 | Bohnen | |
| 6,589,905 B1 | 7/2003 | Fischer et al. | |
| 6,608,000 B1 | 8/2003 | Bamberger et al. | |
| 6,780,809 B1 | 8/2004 | Follestad et al. | |
| 6,812,185 B2 | 11/2004 | Fischer et al. | |
| 7,053,160 B1 | 5/2006 | Bingel et al. | |
| 7,238,818 B2 | 7/2007 | Ewen et al. | |
| 2002/0010077 A1 | 1/2002 | Lue et al. | |
| 2003/0236366 A1 | 12/2003 | McDaniel et al. | |
| 2007/0213205 A1* | 9/2007 | Mihan ........................... | 502/113 |
| 2007/0255033 A1* | 11/2007 | Kipke et al. ................... | 526/352 |
| 2008/0286509 A1 | 11/2008 | Kipke et al. | |

FOREIGN PATENT DOCUMENTS

| | | |
|---|---|---|
| BE | 861275 | 3/1978 |
| DE | 2103243 | 8/1972 |
| DE | 2540279 | 3/1977 |
| DE | 3437116 | 5/1985 |
| DE | 3635710 | 4/1988 |
| EP | 166157 | 1/1986 |
| EP | 339571 | 11/1989 |
| EP | 589350 | 3/1994 |
| EP | 739937 | 10/1996 |
| WO | 91/09882 | 7/1991 |
| WO | 93/03093 | 2/1993 |
| WO | 93/19924 | 10/1993 |
| WO | 95/11264 | 4/1995 |
| WO | 96/00243 | 1/1996 |
| WO | 97/04015 | 2/1997 |

(Continued)

OTHER PUBLICATIONS

Ruff und Doak, "Molecular Weight Averages of Convenient Functions," *High Polymers*, Interscience Publishers, John Wiley & Sons, p. 442-443 (1965).
J. Randall, "A Review of High Resolution Liquid $^{13}$Carbon Nuclear Magnetic Resonance Characteristics of Ethylene-Based Polymers," *JMS-Rev. Macromol. Chem. Phys.*, C29(2&3), p. 201-317 (1989).
S. Pang et al., edited by Theodore Provder, "Size-Exclusion Chromatographic Assessment of Long-Chain Branch Frequency in Polyethylene," ACS Symposium series 521, *Chromatography of Polymers*, p. 254-269 (1993).
J. Ewen et al., "Expanding the Scope of Metallocene Catalysis: Beyond Indenyl and Fluorenyl Derivatives," *European Journal of Inorganic Chemistry*, Springer, Verlag, p. 150-169 (1999).
S. Strauss, "The Search for Larger and More Weakly Coordinating Anions," *Chem. Rev.*, vol. 93(3), p. 927-942 (1993).

(Continued)

*Primary Examiner* — Roberto Rabago
(74) *Attorney, Agent, or Firm* — Dilworth IP, LLC

(57) ABSTRACT

Monomodal molding compositions based on polymers of ethylene, wherein the density of the molding compositions is in the range from 0.940 to 0.96 g/cm$^3$, the Mi is in the range from 0.5 to 10.0 g/10 min. the polydispersity $M_w/M_n$ is in the range from 3 to 20, the branches/1000 carbon atoms is in the range from 0.1 to 10 and the weight average molar mass $M_w$ is in the range from 50 000 g/mol to 150 000 g/mol, and also injection-molded shaped bodies as well as screw closures comprising the molding compositions.

12 Claims, No Drawings

FOREIGN PATENT DOCUMENTS

| | | |
|---|---|---|
| WO | 97/08213 | 3/1997 |
| WO | 97/36937 | 10/1997 |
| WO | 98/22486 | 5/1998 |
| WO | 98/40419 | 9/1998 |
| WO | 99/06414 | 2/1999 |
| WO | 00/05277 | 2/2000 |
| WO | 00/14129 | 3/2000 |
| WO | 00/24787 | 5/2000 |
| WO | 00/31090 | 6/2000 |
| WO | 00/71615 | 11/2000 |
| WO | 01/41920 | 6/2001 |
| WO | 2005/068519 | 7/2005 |
| WO | 2005/103095 | 11/2005 |
| WO | 2005/103096 | 11/2005 |
| WO | 2005/103100 | 11/2005 |
| WO | 2006/114209 | 11/2006 |

OTHER PUBLICATIONS

R. Halterman, "Synthesis and Applications of Chiral Cyclopentadienylmetal Complexes," *Chem. Rev.*, vol. 92(5), p. 965-994 (1992).

H. Wiesenfeldt et al., "XVII. Racemic and meso diastereomers of group IV metallocene derivatives with symmetrically substituted, dimethylsilanediyl-bridged ligand frameworks. Crystal structure of R,S-Me$_2$Si(3-t-Bu-5-MeC$_5$H$_2$)$_2$ZrCl$_2$," *Journal of Organometallic Chemistry*, vol. 369, p. 359-370 (1989).

"Polymer Blends," *Ullmann's Encyclopedia of Industrial Chemistry*, 6$^{th}$ edition, 2000 Electronic Release, p. 1-43 (2000).

L. Wold, "Temperature Rising Elution Fractionation," *Advances in Polymer Science 98*, Springer-Verlag berlin Heidelberg 1990; vol. 98, p. 1-47 (1991).

\* cited by examiner

POLYETHYLENE MOLDING COMPOSITIONS FOR INJECTION MOLDING APPLICATIONS

The present invention relates to monomodal molding compositions based on polymers of ethylene, wherein the density of the molding compositions is in the range from 0.940 to 0.96 g/cm$^3$, the MI is in the range from 0.5 to 10.0 g/10 min, the polydispersity $M_w/M_n$ is in the range from 3 to 20, the branches/1000 carbon atoms is in the range from 0.1 to 10 and the weight average molar mass Mw is in the range from 50 000 g/mol to 150 000 g/mol.

The invention further relates to injection-molded shaped bodies as well as to screw closures comprising the above-mentioned molding compositions.

Mixtures based on ethylene polymers, hereinafter referred to as polyethylene blends, are known and are used, for example, as described in DE-C 34 37 116, for producing shaped bodies which are resistant to environmental stress cracking.

Over the recent period, polyethylene blends are being used for producing screw closures of all types by means of plastics injection molding. It is advantageous for the screw closures to retain their dimensions and shape, i.e. not to shrink (low shrinkage), after the injection molding process, i.e. on cooling. The injection molding process is generally made easier when the polyethylene molding compositions readily flow in the melt (good flowability). Low shrinkage and shape stability are important properties of plastics from which, for example, accurately fitting screw closures are to be produced.

WO 00/71615 describes injection-molded containers comprising a bimodal polyethylene having a density of from 0.950 to 0.98 g/cm$^3$, a crystallinity of 60-90% and comprising at least two polyethylene components which have different molar mass distributions and of which at least one is an ethylene copolymer. To produce such polyethylene blends, a reactor cascade was used or the two components were mixed by melt extrusion.

The mechanical strength of shaped bodies comprising polyethylene also have to meet increasingly stringent requirements. At the same time, highly transparent products are desirable for many applications, so that the contents of the package can readily be seen.

The known molding compositions still leave something to be desired in respect of the combined property profile of good flowability and high mechanical strength combined with good optics.

It was therefore an object of the invention to remedy these deficiencies and, in particular, to provide polyethylene molded compositions which have good flowability combined with good mechanics and good optics.

Accordingly, we have found monomodal molding compositions based on polymers of ethylene, wherein the density of the molding compositions is in the range from 0.940 to 0.96 g/cm$^3$, the MI is in the range from 0.5 to 10 g/10 min, the polydispersity $M_w/M_n$ is in the range from 3 to 20, the branches/1000 carbon atoms is in the range from 0.1 to 10 and the weight average molar mass Mw is in the range from 50 000 g/mol to 150 000 g/mol. We have also found injection-molded shaped bodies as well as screw closures comprising such molding compositions.

The molding composition of the invention has a polydispersity Mw/Mn in the range from 3 to 20, preferably from 3.2 to 9 and particularly preferably from 3.6 to 6. The density of the polyethylene of the invention is in the range from 0.94 to 0.96 g/cm$^3$, preferably from 0.945 to 0.955 g/cm$^3$, and particularly preferably in the range from 0.947 to 0.953 g/m. The weight average molar mass Mw of the polyethylene of the invention is in the range from 50 000 g/mol to 150 000 g/mol, preferably from 70 000 g/mol to 120 000 g/mol and particularly preferably from 80 000 g/mol to 110 000 g/mol. The MI is in the range from 0.5 to 10 g/10 min, preferably from 1 to 8 g/10 min and particularly preferably from 2 to 6 g/10 min.

The molding composition of the invention has from 0.1 to 10 branches/1000 carbon atoms, preferably from 0.2 to 5 branches/1000 carbon atoms and particularly preferably from 0.3 to 2 branches/1000 carbon atoms. The branches/1000 carbon atoms are determined by means of $^{13}$C-NMR as described by James C. Randall, JMS-REV. Macromol. Chem. Phys., C29 (2&3), 201-317 (1989), and are based on the total CH$_3$ group content/1000 carbon atoms including end groups.

The molding composition of the invention preferably has a CDBI of less than 50%, in particular from 10 to 45%. The method of determining the CDBI is described, for example, in WO 93/03093. The method of TREF is described, for example, in Wild, Advances in Polymer Science, 98, p. 1-47, 57 p. 153, 1992. The CDBI is defined as the percentage by weight of the copolymer molecules having a comonomer content of ±25% of the mean total molar comonomer content.

For the purposes of the present patent application, a monomodal molding composition is a molding composition whose molar mass distribution is monomodal. For the purposes of the present patent application, a monomodal molar mass distribution means that the molar mass distribution curve has a single maximum. Polymers of ethylene are ethylene homopolymers and/or ethylene copolymers. As comonomers which may be present in addition to ethylene in the ethylene copolymer part of the molding composition of the invention, either individually or in admixture with one another, it is possible to use all α-olefins having from 3 to 12 carbon atoms, e.g. propene, 1-butene, 1-pentene, 1-hexene, 4-methyl-1-pentene, 1-heptene, 1-octene and 1-decene. The ethylene copolymer preferably comprises, as comonomer unit, α-olefins having from 4 to 9 carbon atoms, e.g. 1-butene, 1-pentene, 1-hexene, 4-methylpentene or 1-octene, in copolymerized form. Particular preference is given to using α-olefins selected from the group consisting of 1-butene, 1-hexene and 1-octene. The ethylene copolymer preferably comprises from 0.01 to 5% by weight of comonomer and particularly preferably from 0.1 to 2% by weight of comonomer.

The density [g/cm$^3$] was determined in accordance with ISO 1183. The determination of the molar mass distributions and the means Mn, Mw and Mw/Mn derived therefrom is carried out by means of high-temperature gel permeation chromatography in using a method based on DIN 55672 on a WATERS 150 C with the following columns connected in series: 3× SHODEX AT 806 MS, 1× SHODEX UT 807 and 1× SHODEX AT-G under the following conditions: solvent: 1,2,4-trichloro-benzene (stabilized with 0.025% by weight of 2,6-di-tert-butyl-4-methylphenol), flow: 1 ml/min, 500 μl injection volume, temperature: 135° C., calibration using PE standards. The evaluation was carried out using WIN-GPC. For the purposes of the present invention, the expression "MI" stands, in a known manner, for "melt index" and is always determined at 190° C. under a load of 2.16 kg (190° C./2.16 kg) in accordance with ISO 1133.

The molding composition of the invention preferably has a content of internal trans double bonds —CH=CH—, hereinafter referred to as trans vinyl groups, of at least 0.05 trans vinyl groups/1000 carbon atoms, in particular from 0.1 to 1 trans vinyl groups/1000 carbon atoms and particularly preferably from 0.2 to 0.5 trans vinyl groups/1000 carbon atoms. The determination is carried out in accordance with ASTM D 6248-98.

In addition, the molding compositions of the invention can further comprise from 0 to 6% by weight, preferably from 0.1 to 1% by weight, based on the mass of the ethylene polymers, of the customary additives for thermoplastics, e.g. processing stabilizers, stabilizers against the effects of light and heat, customary additives such as lubricants, antioxidants, antiblocking agents and antistatics, and also, if appropriate, dyes. Preference is given to using, inter alia, lubricants (Ca stearate); customary stabilizers, for example phenols, phosphites, benzophenone, benzotriazoles or thioethers; fillers, for example $TiO_2$, chalk or carbon black; customary pigments, for example $TiO_2$, ultramarine blue. The additives are usually incorporated by mixing with the molding composition using the methods customary in plastics technology, for example melt extrusion, rolling, compacting or solution mixing. Preference is given to using melt extrusion, for example in a twin-screw extruder. In general, the extrusion temperatures are in the range from 140 to 250° C.

We have also found injection-molded shaped bodies comprising monomodal molding compositions based on polymers of ethylene, wherein the density of the molding compositions is in the range from 0.940 to 0.96 g/cm³, the HLMI is in the range from 0.5 to 10.0 g/10 min, the polydispersity $M_w/M_n$ is in the range from 3 to 20, the branches/1000 carbon atoms is in the range from 0.1 to 10 and the weight average molar mass Mw is in the range from 50 000 g/mol to 150 000 g/mol.

The polyethylene of the invention and the injection-molded shaped bodies of the invention having a thickness of 1 mm preferably have a haze of less than 80% and in particular in the range from 10 to 78% and particularly preferably from 30 to 75%. The haze is measured in accordance with ASTM D 1003-00 on a BYK Gardener Haze Guard Plus Device on at least 5 films having a size of 10×10 cm. The impact resistance determined as instrument failing weight impact test at −20° C. of the injection-molded shaped bodies of the invention and polyethylenes having a thickness of 1 mm is preferably greater than 12 J, in particular in the range from 12.5 to 50 J and particularly preferably from 13 to 30 J, measured in accordance with ISO 6603.

The injection-molded shaped bodies are produced on customary injection-molding machines. Screw lengths of 18-22 D are particularly useful.

The flow properties under processing conditions were determined using the spiral test. The polyethylene is, for this purpose, injected at a defined temperature, pressure and screw speed into a spiral mold. This gives polyethylene spirals having a particular wall thickness. The length of the spirals is a measure of the flow properties of the polyethylene used. The spiral test is carried out on a Demag ET100-310 using a closure force of 100 t and a 3 mm die.

To test the dimensional and shape stability of the polyethylene of the invention, plastic closures were produced in an injection molding machine provided with a thread tool (thread diameter: 28.2 mm) at from 180 to 270° C., allowed to cool, the external thread diameter of 50 test specimens was measured, the mean in mm was calculated, the deviation from the thread tool diameter was determined and the test specimens were assessed visually for dimensional and shape stability.

The polyethylene of the invention displays good flow properties with spiral lengths of above 40 cm, measured at a melt temperature of 230° C., an injection pressure of 1000 bar, a screw speed of 90 mm/s, a mold temperature of 30° C. and a wall thickness of 2 mm, combined with good dimensional and shape stability (low shrinkage). They can be processed further in a particularly advantageous fashion to produce screw closures, in particular for beverage bottles or pipe fitting.

The molding composition of the invention is obtainable using the catalyst composition of the invention and in particular its preferred embodiments.

The present invention further provides a catalyst composition comprising at least two different polymerization catalysts of which at least one (A) is a polymerization catalyst based on a bridged metallocene complex of a metal of group 4 of the Periodic Table of the Elements and at least one (B) is a polymerization catalyst based on an unbridged metallocene complex of a metal of group 4 of the Periodic Table of the Elements.

The invention further provides a process for the polymerization of olefins in the presence of the catalyst composition of the invention.

Suitable bridged metallocene complexes (A) are complexes of the general formula (I)

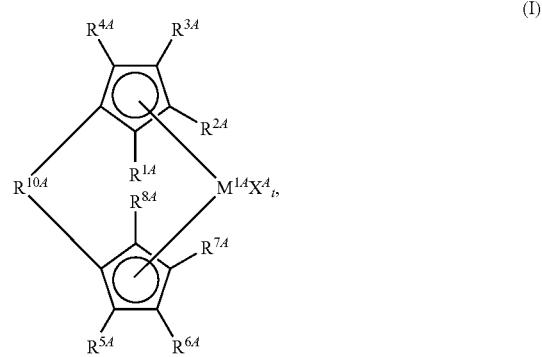

where the substituents and indices have the following meanings:

$M^{1A}$ is a metal of group 4 of the Periodic Table of the Elements, in particular Zr $R^{1A}$ to $R^{8A}$ are each, independently of one another, hydrogen, $C_1$-$C_{22}$-alkyl, $C_2$-$C_{22}$-alkenyl, $C_6$-$C_{22}$-aryl, arylalkyl having from 1 to 16 carbon atoms in the alkyl radical and from 6 to 21 carbon atoms in the aryl radical, $NR^{9A}{}_2$, $N(SiR^{9A}{}_3)_2$, $OR^{9A}$, $OSiR^{9A}{}_3$, $SiR^{9A}{}_3$, where the organic radicals $R^{1A}$-$R^{8A}$ may also be substituted by halogens and/or two adjacent radicals $R^{1A}$-$R^{8A}$ may also be joined to form a five-, six- or seven-membered ring, and/or two adjacent radicals $R^{1A}$-$R^{8A}$ may be joined to form a five-, six- or seven-membered heterocycle which comprises at least one atom from the group consisting of N, P, O and S, where $R^{9A}$ are identical or different and are each $C_1$-$C_{20}$-alkyl, $C_6$-$C_{15}$-aryl, arylalkyl having from 1 to 16 carbon atoms in the alkyl radical and from 6 to 21 carbon atoms in the aryl radical, and $R^{10A}$ is

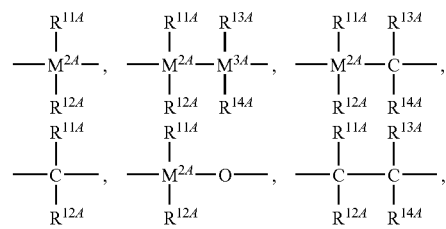

-continued

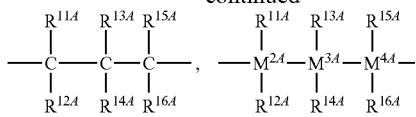

=BR$^{11A}$, =BNR$^{11A}$R$^{12A}$, =AlR$^{16B}$, —Ge—, —Sn—, —O—, —S—, =SO, =SO$_2$, =NR$^{11A}$, =CO, =PR$^{11A}$ or =P(O)R$^{11A}$, where R$^{11A}$-R$^{16A}$ are identical or different and are each a hydrogen atom, a halogen atom, a trimethylsilyl group, a C$_1$-C$_{10}$-alkyl group, a C$_1$-C$_{10}$-fluoroalkyl group, a C$_6$-C$_{10}$-fluoroaryl group, a C$_6$-C$_{10}$-aryl group, a C$_1$-C$_{10}$-alkoxy group, a C$_6$-C$_{15}$-aryloxy group, a C$_2$-C$_{10}$-alkenyl group or a C$_7$-C$_{40}$-arylalkyl group or two adjacent radicals together with the atoms connecting them form a saturated or unsaturated ring having from 4 to 15 carbon atoms, and M$^{2A}$-M$^{4A}$ are each silicon, germanium or tin, preferably silicon X$^A$ is fluorine, chlorine, bromine, iodine, hydrogen, C$_1$-C$_{10}$-alkyl, C$_2$-C$_{10}$-alkenyl, C$_6$-C$_{15}$-aryl, arylalkyl having from 1 to 10 carbon atoms in the alkyl radical and from 6 to 20 carbon atoms in the aryl radical, —OR$^{17A}$ or —NR$^{17A}$R$^{18A}$, OC(O)R$^{17A}$, —O$_3$SR$^{17A}$, R$^{17A}$C(O)—CH—CO—R$^{18A}$, CO or two radicals X$^A$ form a substituted or unsubstituted diene ligand, in particular a 1,3-diene ligand, and the radicals X$^A$ are identical or different and may be joined to one another, where R$^{17A}$ and R$^{18A}$ are each C$_1$-C$_{10}$-alkyl, C$_6$-C$_{15}$-aryl, arylalkyl, fluoroalkyl or fluoroaryl each having from 1 to 10 carbon atoms in the alkyl radical and from 6 to 20 carbon atoms in the aryl radical and t is 1 or 2, with t being, depending on the valence of M$^{1A}$, such that the metallocene complex of the general formula (I) is uncharged.

For the purposes of the present invention, the term alkyl refers to a linear, cyclic or branched alkyl group such as methyl, ethyl, n-propyl, isopropyl, n-butyl, isobutyl, tert-butyl, n-pentyl, n-hexyl, n-heptyl, n-octyl, n-nonyl, n-decyl, 5- to 12-membered cycloalkyl which may in turn bear a C$_1$-C$_{10}$-alkyl group as substituent, e.g. cyclopropane, cyclobutane, cyclopentane, cyclohexane, cycloheptane, cyclooctane, cyclononane or cyclododecane. The term alkenyl refers to a linear, cyclic or branched alkenyl in which the double bond can be internal or terminal, e.g. vinyl, 1-allyl, 2-allyl, 3-allyl, 1-butenyl, 2-butenyl, 1-pentenyl, 1-hexenyl, 5- to 12-membered cycloalkenyl which may in turn bear a C$_1$-C$_{10}$-alkyl group as substituent, e.g. cyclopentene, cyclohexene, cycloheptene, cyclooctene. The term C$_6$-C$_{22}$-aryl refers to an unsubstituted, substituted or fused aryl system, with the aryl radical being able to be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl. The term arylalkyl refers to an aryl-substituted alkyl in which the alkyl part may be linear, cyclic or branched and the aryl part may be substituted by further alkyl groups, e.g. benzyl, o-, m-, p-methylbenzyl, 1- or 2-ethylphenyl.

Suitable unbridged metallocene complexes (B) are complexes of the general formula (II)

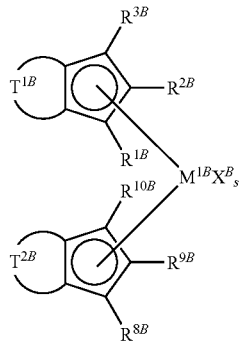

(II)

where the substituents and indices have the following meanings:

M$^{1B}$ is a metal of group 4 of the Periodic Table of the Elements, in particular Zr T$^{1B}$ is

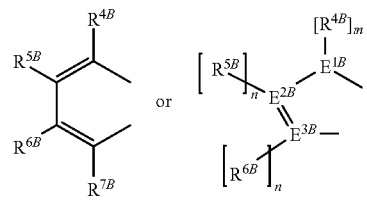

T$^{2B}$ is

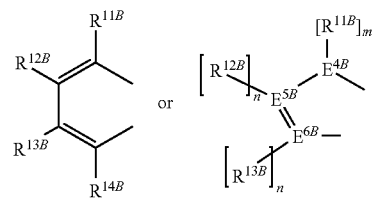

E$^{1B}$, E$^{4B}$ are each, independently of one another, nitrogen, phosphorus, oxygen or sulfur m is 0 when E$^{1B}$ or E$^{4B}$ is oxygen or sulfur and is 1 when E$^{1B}$ or E$^{4B}$ is nitrogen or phosphorus, E$^{2B}$, E$^{3B}$, E$^{5B}$, E$^{6B}$ are each, independently of one another, carbon, nitrogen or phosphorus n is 0 when E$^{2B}$, E$^{3B}$, E$^{5B}$ or E$^{6B}$ is nitrogen or phosphorus and is 1 when E$^{1B}$ or E$^{4B}$ is carbon, R$^{1B}$ to R$^{14B}$ are each, independently of one another, hydrogen, C$_1$-C$_{22}$-alkyl, C$_2$-C$_{22}$-alkenyl, C$_6$-C$_{22}$-aryl, arylalkyl having from 1 to 16 carbon atoms in the alkyl radical and from 6 to 21 carbon atoms in the aryl radical, NR$^{15B}$$_2$, N(SiR$^{15B}$$_3$)$_2$, OR$^{15B}$, OSiR$^{15B}$$_3$, SiR$^{15B}$$_3$, where the organic radicals R$^{1B}$-R$^{14B}$ may also be substituted by halogens and/or two adjacent radicals R$^{1B}$-R$^{14BB}$ may also be joined to form a five-, six- or seven-membered ring, and/or two adjacent radicals R$^{1B}$-R$^{14B}$ may be joined to form a five-, six- or seven-membered heterocycle which comprises at least one atom from the group consisting of N, P, O and S, where R$^{15B}$ are identical or different and are each C$_1$-C$_{20}$-alkyl, C$_6$-C$_{15}$-aryl, arylalkyl having from 1 to 16 carbon atoms in the alkyl radical and from 6 to 21 carbon atoms in the aryl radical, and $X^B$ is fluorine, chlorine, bromine, iodine, hydrogen, $C_1$-$C_{10}$-alkyl, $C_2$-$C_{10}$-alkenyl, $C_6$-$C_{15}$-aryl, arylalkyl having from 1 to 10 carbon atoms in the alkyl radical and from 6 to 20 carbon atoms in the aryl radical,
—$OR^{16B}$ or —$NR^{16B}R^{17B}$, —$OC(O)R^{16A}$, —$O_3SR^{16B}$, $R^{16B}C(O)$—CH—CO—$R^{17B}$, CO or two radicals $X^B$ form a substituted or unsubstituted diene ligand, in particular a 1,3-diene ligand, and the radicals $X^B$ are identical or different and may be joined to one another, s is 1 or 2, with s being, depending on the valence of $M^{1B}$, such that the metallocene complex of the general formula (II) is uncharged, where $R^{16B}$ and $R1^{7B}$ are each $C_1$-$C_{10}$-alkyl, $C_6$-$C_{15}$-aryl, arylalkyl, fluoroalkyl or fluoroaryl each having from 1 to 10 carbon atoms in the alkyl radical and from 6 to 20 carbon atoms in the aryl radical.

The chemical structure of the substituents $R^{1A}$ to $R^{8A}$ and $R^{1B}$ to $R^{14B}$ can be varied within a wide range. Possible carboorganic substituents are, for example, the following: hydrogen, $C_1$-$C_{22}$-alkyl which may be linear, cyclic or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 3- to 12-membered cycloalkyl which may in turn bear a $C_1$-$C_{10}$-alkyl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5-, or 2,6-dimethylphenyl, 2,3, 4-, 2,3,5-, 2,3,6-, 2,4,5-, 2,4,6- or 3,4,5-trimethylphenyl, or an aryl-substituted alkyl radical arylalkyl which may be substituted by further alkyl groups, e.g. benzyl, o-, m-, p-methylbenzyl, 1- or 2-ethylphenyl, where two adjacent radicals $R^{1A}$ to $R^{8A}$ and/or $R^{1B}$ to $R^{14B}$ may also be joined to form a 5-, 6- or 7-membered ring and/or two of the adjacent radicals $R^{1A}$ to $R^{8A}$ and/or $R^{1B}$ to $R^{14B}$ may be joined to form a five-, six- or seven-membered heterocycle which comprises at least one atom from the group consisting of N, P, O and S and/or the organic radicals $R^{1A}$ to $R^{8A}$ and $R^{1B}$ to $R^{14B}$ may also be substituted by halogens such as fluorine, chlorine or bromine. Furthermore, $R^{1A}$ to $R^{8A}$ can be amino $NR^{9A}_2$ or $N(SiR^{9A}_3)_2$, alkoxy or aryloxy $OR^{9A}$, and $R^{1B}$ to $R^{14B}$ can be amino $NR^{15B}_2$ or $N(SiR^{15B}_3)_2$, alkoxy or aryloxy $OR^{15B}$, for example dimethylamino, N-ethylmethylamino, diethylamino, N-methylpropylamino, N-methylisopropylamino, N-ethylisopropylamino, dipropylamino, diisopropylamino, N-methyl-butylamino, N-ethylbutylamino, N-methyltert-butylamino, dibutylamino, di-sec-butylamino, diisobutylamino, N-methylhexylamino, dihexylamino, N-methylcyclohexylamino, N-ethylcyclohexylamino, N-isopropylcyclohexylamino, dicyclohexylamino, N-pyrrolidinyl, piperidinyl, decahydroquinolino, diphenylamino, N-methylaniline or N-ethylaniline, methoxy, ethoxy or isopropoxy. Possible radicals $R^{9A}$ or $R^{15B}$ in organosilicon substituents $SiR^{9A}_3$ and $SiR^{15B}_3$ are the same carboorganic radicals as mentioned above for $R^{1A}$ to $R^{8A}$ and $R^{1B}$ to $R^{14B}$, with two radicals $R^{9A}$ or $R^{15B}$ also being able to be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. The radicals $SiR^{9A}_3$ or $SiR^{15B}_3$ can also be joined to the cyclopentadienyl skeleton via an oxygen or nitrogen atom, for example trimethylsilyloxy, triethylsilyloxy, butyldimethylsilyloxy, tributylsilyloxy or tri-tert-butylsilyloxy.

Two adjacent radicals $R^{1A}$ to $R^{8A}$ and/or $R^{1B}$ to $R^{14B}$ can, in each case together with the carbon atoms bearing them, form a heterocycle, preferably a heteroaromatic, which comprises at least one atom from the group consisting of nitrogen, phosphorus, oxygen and sulfur, particularly preferably nitrogen and/or sulfur. Preference is given to heterocycles and heteroaromatics having a ring size of 5 or 6 ring atoms. Examples of 5-membered heterocycles which can comprise from one to four nitrogen atoms and/or a sulfur or oxygen atom as ring atoms in addition to carbon atoms are 1,2-dihydrofuran, furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups which can comprise from one to four nitrogen atoms and/or a phosphorus atom are pyridine, phosphabenzene, pyridazine, pyrimidine, pyrazine, 1,3,5-triazine, 1,2,4-triazine and 1,2,3-triazine. The 5-membered and 6-membered heterocycles may also be substituted by $C_1$-$C_{10}$-alkyl, $C_6$-$C_{10}$-aryl, arylalkyl having from 1 to 10 carbon atoms in the alkyl radical and 6-10 carbon atoms in the aryl radical, trialkylsilyl or halogens such as fluorine, chlorine or bromine, dialkylamide, alkylarylamide, diarylamide, alkoxy or aryloxy or be fused with one or more aromatics or heteroaromatics. Examples of benzo-fused 5-membered heteroaryl groups are indole, indazole, benzofuran, benzothiophene, benzothiazol, benzoxazole and benzimidazole. Examples of benzo-fused 6-membered heteroaryl groups are chromane, benzoypyran, quinoline, isoquinoline, cinnoline, phthalazine, quinazoline, quinoxaline, 1,10-phenanthroline and quinolizine. Nomenclature and numbering of the heterocycles has been taken from Lettau, Chemie der Heterocyclen, 1st edition, VEB, Weinheim 1979. The heterocycles/heteroaromatics are preferably fused to the cyclopentadienyl skeleton via a C—C double bond of the heterocycle/heteroaromatic. The heterocycles/heteroaromatics having a heteroatom are preferably 2,3- or b-fused.

Particular preference is given to the substituent $R^{1A}$ together with $R^{2A}$ and also $R^{8A}$ together with $R^{9A}$, in each case together with the two carbon atoms of the $C_5$-cyclopentadienyl skeleton which bear them, each forming a 6-membered, nonaromatic, substituted or unsubstituted ring system. Particular preference is given to unsubstituted or substituted tetrahydroindenyl systems. Examples of such cyclopentadienyl systems are tetrahydroindenyl, 2-methyltetrahydroindenyl, 2-ethyltetrahydroindenyl, 2-isopropyltetrahydroindenyl, 3-methyltetrahydroindenyl or 2,4-dimethyl-tetrahydroindenyl. The fused ring system can likewise bear further $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, $NR^{9A}_2$, $N(SiR^{9A}_3)_2$, $OR^{9A}$, $OSiR^{9A}_3$ or $SiR^{9A}_3$ groups, e.g. 4-methyltetrahydroindenyl, 4-ethyltetrahydroindenyl, 4-isopropyltetrahydroindenyl, 5-methyltetrahydroindenyl, 4-phenyltetrahydroindenyl, 5-methyl-4-phenyltetrahydroindenyl, 2-methyl-4-phenyltetrahydroindenyl or 4-naphthyltetrahydroindenyl.

$T^{1B}$ and $T^{2B}$ each form, together with the cyclopentadienyl system, a fused heteroaromatic 5-membered ring or a fused aromatic 6-membered ring. $E^{1B}$ can be located on the carbon atom adjacent to the carbon atom bearing $R^{3B}$ or $R^{1B}$. $E^{4B}$ can be located on the carbon atom adjacent to the carbon atom bearing $R^{8B}$ or $R^{10B}$. $E^{1B}$ and $E^{4B}$ are preferably sulfur or nitrogen. $E^{2B}$, $E^{3B}$, $E^{5B}$ and $E^{6B}$ are preferably carbon. Preferred systems (together with the cyclopentadienyl system) are, for example, thiapentalene, 2-methylthiapentalene, 2-ethylthiapentalene, 2-isopropylthiapentalene, 2-n-butylthiapentalene, 2-tert-butylthiapentalene, 2-trimethylsilylthiapentalene, 2-phenylthiapentalene, 2-naphthylthiapentalene, 3-methylthiapentalene, 4-phenyl-2,6-dimethyl-1-thiapentalene, 4-phenyl-2,6-diethyl-1-thiapentalene, 4-phenyl-2,6-diisopropyl-1-thiapentalene, 4-phenyl-2,6-di-n-butyl-1-thiapentalene, 4-phenyl-2,6-di-trimethylsilyl-1-thiapentalene, azapentalene, 1-methylazapentalene, 1-ethylazapentalene, 1-isopropylazapentalene, 1-n-butyl-azapentalene, 1-trimethylsilylazapentalene, 1-phenylazapentalene, 1-naphthylazapentalene, 1-phenyl-2,5-dimethyl-1-azapentalene, 1-phenyl-2,5-diethyl-1-azapentalene, 1-phenyl-2,5-di-n-butyl-1-azapentalene, 1-phenyl-2,5-di-tert-butyl-1-azapentalene, 1-phenyl-2,5-di-trimethylsilyl-1-azapentalene, 1-tert-butyl-2,5-dimethyl-1-azapentalene, oxapentalene, phosphapentalene, 1-phenyl-2,5-dimethyl-1-phosphapentalene, 1-phenyl-2,5-diethyl-1-phosphapentalene, 1-phenyl-2,5-di-n-butyl-1-phosphapentalene, 1-phenyl-2,5-di-tert-butyl-1-phosphapentalene, 1-phenyl-2,5-di-trimethylsilyl-1-phosphapentalene, 1-methyl-2,5-dimethyl-1-phosphapentalene, 1-tert-butyl-2,5-dimethyl-1-phosphapentalene, 7-cyclopenta[1,2]thiopheno[3,4]cyclopentadienes or 7-cyclopenta[1,2]pyrrolo[3,4]cyclopentadienes. The synthesis of such cyclopentadienyl systems having a fused-on heterocycle is described, for example, in WO 98/22486. In "Metalorganic catalysts for synthesis and polymerisation", Springer Verlag 1999, Ewen et al. p. 150 ff describe further syntheses of these cyclopentadienyl systems.

$T^{1B}$ and $T^{2B}$ are preferably the diene structures depicted above and, together with the cyclopentadienyl skeleton bearing them, preferably form a substituted or unsubstituted indenyl system such as indenyl, 2-methylindenyl, 2-ethylindenyl, 2-isopropylindenyl, 3-methylindenyl, benzindenyl or 2-methylbenzindenyl. The fused ring system can bear further $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, $NR^{15B}_2$, $N(SiR^{15B}_3)_2$, $OR^{15B}$, $OSiR^{15B}_3$ or $SiR^{15B}_3$ groups, e.g. 4-methylindenyl, 4-ethylindenyl, 4-isopropylindenyl, 5-methylindenyl, 4-phenylindenyl, 5-methyl-4-phenylindenyl, 2-methyl-4-phenylindenyl or 4-naphthylindenyl.

The bridge $R^{10A}$ between the two cyclopentadienyl systems preferably comprises carbon- and/or silicon-comprising bridge members. $R^{10A}$ is preferably bound not only to the fused nonaromatic 6-membered ring system but also to the cyclopentadienyl skeleton. If the 6-membered ring system is fused on in the 2,3 position of the cyclopentadienyl skeleton, $R^{10A}$ is preferably present in the 1 or 4 position of the cyclopentadienyl skeleton.

$R^{10A}$ is preferably a $—CR^{11A}R^{12A}—$, $—SiR^{11A}R^{12A}$, $—CR^{11A}R^{12A}CR^{13A}R^{14A}—$ or $—SiR^{11A}R^{12A}CR^{13A}R^{14A}—$ group, in particular $—SiR^{11A}R^{12A}—$, $—CR^{11A}R^{12A}CR^{13A}R^{14A}—$ and particularly preferably $—Si(CH_3)_2—$, $—CH_2—CH_2—$ or $—C(CH_3)_2—C(CH_3)_2—$.

The ligands $X^A$ or $X^B$ are determined, for example, by the choice of the corresponding metal starting compounds which are used for the synthesis of the metallocene complexes (B), but can also be varied afterward. Possible ligands $X^A$ or $X^B$ are, in particular, the halogens such as fluorine, chlorine, bromine or iodine, in particular chlorine. Alkyl radicals such as methyl, ethyl, propyl, butyl, vinyl, allyl, phenyl or benzyl are also advantageous ligands $X^A$ or $X^B$. As further ligands $X^A$ or $X^B$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$.

Amides, alkoxides, sulfonates, carboxylates and β-diketonates are also particularly useful ligands $X^A$ or $X^B$. Variation of the radicals $R^{18A}$ or $R^{16B}$ and $R^{17B}$ allows, for example, fine adjustments to be made in physical properties such as solubility. Possible carboorganic substituents $R^{17A}$ and $R^{18A}$ or $R^{16B}$ and $R^{17B}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 3- to 12-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N— or O— comprising radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where $R^{17A}$ may also be joined to $R^{18A}$ or $R^{16B}$ may also be joined to $R^{17B}$ to form a 5- or 6-membered ring and the organic radicals $R^{17A}$ and $R^{18A}$ or $R^{16B}$ and $R^{17B}$ may also be substituted by halogens such as fluorine, chlorine or bromine. Some of the substituted ligands $X^A$ or $X^B$ are particularly preferably used since they are obtainable from cheap and readily available starting materials. Thus, a particularly preferred embodiment is when $X^A$ or $X^B$ is dimethylamide, methoxide, ethoxide, isopropoxide, phenoxide, naphthoxide, triflate, p-toluenesulfonate, acetate or acetylacetonate.

The number t or s of the ligands $X^A$ or $X^B$ depends on the oxidation state of the transition metal $M^A$ or $M^B$. The index t or s can thus not be given in general terms. The oxidation state of the transition metal $M^A$ or $M^B$ in catalytically active complexes is usually known to those skilled in the art. Zirconium and hafnium are very probably present in the oxidation state +4. However, it is also possible to use complexes whose oxidation state does not correspond to that of the active catalyst. Such complexes can then be appropriately oxidized by means of suitable activators. Preference is given to using zirconium complexes in the oxidation state +4.

The radicals $X^A$ and $X^B$ are preferably fluorine, chlorine, bromine, $C_1$-$C_7$-alkyl or benzyl, in particular chlorine.

The metallocene complexes can also be chiral. Thus, the meso or racemic form or mixtures of the two forms can be used (with regard to the conventions pertaining to chirality in cyclopentadienyl compounds, see R. Halterman, Chem. Rev. 92, (1992), 965-994). Preference is given to using metallocenes in the racemic form or in a form enriched with racemate.

The synthesis of such complexes can be carried out by methods known per se, with the reaction of the appropriately substituted, cyclic hydrocarbon anions with halides of zirconium being particularly preferred. Examples of appropriate preparative methods are described, inter alia, in Journal of Organometallic Chemistry, 369 (1989), 359-370.

Examples of particularly useful zirconocenes (A) are, inter alia, dimethylsilanediylbis(tetrahydroindenyl)hafnium dichloride, ethylenebis(tetrahydroindenyl)hafnium dichloride, methylenebis(tetrahydroindenyl)zirconium dichloride, isopropylidenebis(tetrahydro-indenyl)zirconium dichloride, dimethylsilanediylbis(tetrahydroindenyl)zirconium dichloride, dimethylsilanediylbis(2-methyltetrahydroindenyl)zirconium dichloride, dimethylsilanediylbis(2-ethyltetrahydroindenyl)zirconium dichloride, ethylenebis(tetrahydroindenyl)zirconium dichloride, ethylenebis(2-methyltetrahydroindenyl)zirconium dichloride or ethylenebis(2-isopropyltetrahydroindenyl)zirconium dichloride.

The complexes can be used in the rac form, the meso form or as mixtures of these and are preferably used in the rac form or in a rac-enriched form.

The zirconocenes of the formula (II) in which the cyclopentadienyl radicals are identical are particularly useful.

Further examples of particularly suitable catalysts (B) are, inter alia, bis(indenyl)titanium dichloride, bis(fluorenyl)titanium dichloride, bis(indenyl)zirconium dichloride, bis(2-methylindenyl)zirconium dichloride, bis(2-ethylindenyl)zirconium dichloride, bis(2-isopropyl-indenyl)zirconium dichloride, bis(2-tert-butylindenyl)zirconium dichloride, bis (2-methylindenyl)-zirconium dibromide, bis(2-methyl-4,5-benzindenyl)zirconium dichloride, bis(2-methyl-4-phenylindenyl)zirconium dichloride, bis(2-methyl-4-(1-naphthyl) indenyl)zirconium dichloride, bis(2-ethyl-4-(1-naphthyl) indenyl)zirconium dichloride, bis(2-propyl-4-(1-naphthyl) indenyl)zirconium dichloride, bis(2-i-butyl-4-(1-naphthyl) indenyl)zirconium dichloride, bis(2-propyl-4-(9-phenanthryl)-indenyl)zirconium dichloride, bis(2-methyl-4-isopropylindenyl)zirconium dichloride, bis(2,7-dimethyl-4-isopropylindenyl)zirconium dichloride, bis(2-methyl-4,6-diisopropylindenyl)zirconium dichloride, bis(2-methyl-4-[p-trifluoromethylphenyl]indenyl)zirconium dichloride, bis(2-methyl-4-[3',5'-dimethylphenyl]indenyl)zirconium dichloride, bis(2-methyl-4-[4'-tert-butylphenyl]indenyl)-zirconium dichloride, bis(2-ethyl-4-[4'-tert-butylphenyl]indenyl)zirconium dichloride, bis(2-propyl-4-[4'-tert-butylphenyl]indenyl)zirconium dichloride, bis(2-isopropyl-4-[4'-tert-butylphenyl]indenyl)-zirconium dichloride, bis(2-n-butyl-4-[4'-tert-butylphenyl]indenyl)zirconium dichloride, bis(2-hexyl-4-[4'-tert-butylphenyl]indenyl)zirconium dichloride, (2-isopropyl-4-phenylindenyl)(2-methyl-4-phenylindenyl) zirconium dichloride, (2-isopropyl-4-(1-naphthyl)indenyl) (2-methyl-4-(1-naphthyl)-indenyl)zirconium dichloride, (2-isopropyl-4-[4'-tert-butylphenyl]indenyl)(2-methyl-4-[1'-naphthyl]-indenyl)zirconium dichloride, and also the corresponding dimethylzirconium, monochloromono-(alkylaryloxy)zirconium and di(alkylaryloxy)zirconium compounds. Further examples are the corresponding zirconocene compounds in which one or both of the chloride ligands have been replaced by bromide or iodide.

The catalyst composition of the invention can be used alone or together with further components as catalyst system for olefin polymerization. Furthermore, we have found catalyst systems for olefin polymerization which comprise
A) at least one polymerization catalyst based on a bridged metallocene complex of a metal of group 4 of the Periodic Table of the Elements (A)
B) at least one polymerization catalyst based on an unbridged metallocene complex of a metal of group 4 of the Periodic Table of the Elements (B)
C) optionally one or more activating compounds,
D) optionally one or more organic or inorganic supports,
E) optionally one or more metal compounds comprising a metal of group 1, 2 or 13 of the Periodic Table.

In the following, reference to a complex (A) or (B) or catalyst (A) or (B) means a metallocene complex (A) or (B). The molar ratio of complex (A) to complex (B) is usually in the range from 1:100 to 100:1, preferably from 1:10 to 10:1 and particularly preferably from 1:5 to 5:1. When complex A) is used as sole catalyst under the same reaction conditions in the homopolymerization or copolymerization of ethylene, it preferably produces a higher M, than complex (B) when it is used as sole complex under the same reaction conditions. The preferred embodiments of the complexes (A) and (B) are likewise preferred in the combinations of complexes (A) and (B).

Some of the complexes (A) and/or (B) have little polymerization activity on their own and are then brought into contact with one or more activators, viz. the component (C), in order to be able to display good polymerization activity. Furthermore, the catalyst system therefore optionally comprises, as component (C), one or more activating compounds, preferably one or two activating compounds (C). The catalyst system of the invention preferably comprises one or more activators (C). Here, one or more activating compounds (C) are advantageous, depending on the catalyst combinations (A) and (B). It is possible to use the same activator or activator mixture or different activators for activation of the complex (A) and of the complex (B) of the catalyst composition. It is often advantageous to use the same activator (C) for the two catalysts (A) and (B).

The activator or activators (C) can in each case be used in any amounts based on the complexes (A) and (B) of the catalyst composition of the invention; they are preferably used in excess or in stoichiometric amounts, in each case based on the complex (A) or (B) which they activate. The amount of activating compound(s) to be used depends on the type of activator (C). The molar ratio of complex (A) to activating compound (C) can generally be from 1:0.1 to 1:10 000, preferably from 1:1 to 1:1000. The molar ratio of complex (B) to activating compound (C) is usually also in the range from 1:0.1 to 1:10 000, preferably from 1:1 to 1:2000.

Suitable compounds (C) which are able to react with the complex (A) or with the complex (B) to convert it into a catalytically active, or more active, compound are, for example, compounds such as an aluminoxane, a strong uncharged Lewis acid, an ionic compound having a Lewis-acid cation or an ionic compound having a Brönsted acid as cation.

As aluminoxanes, it is possible to use, for example, the compounds described in WO 00/31090.

Particularly useful aluminoxanes are open-chain or cyclic aluminoxane compounds of the general formula (X) or (XI).

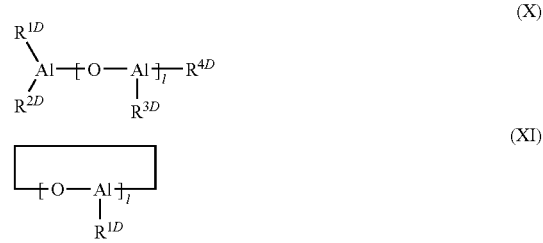

where $R^{1D}$-$R^{4D}$ are each, independently of one another, a $C_1$-$C_6$-alkyl group, preferably a methyl, ethyl, butyl or isobutyl group, and I is an integer from 1 to 40, preferably from 4 to 25.

A particularly useful aluminoxane compound is methylaluminoxane.

These oligomeric aluminoxane compounds are usually prepared by controlled reaction of a solution of trialkylaluminum, in particular trimethylaluminum, with water. In general, the oligomeric aluminoxane compounds obtained in this way are in the form of mixtures of both linear and cyclic chain molecules of various lengths, so that I is to be regarded as a mean. The aluminoxane compounds can also be present in admixture with other metal alkyls, usually aluminum alkyls. Aluminoxane preparations suitable as component (C) are commercially available.

Furthermore, modified aluminoxanes in which some of the hydrocarbon radicals have been replaced by hydrogen atoms or alkoxy, aryloxy, siloxy or amide radicals can also be used as component (C) in place of the aluminoxane compounds of the general formula (X) or (XI).

It has been found to be advantageous to use the complex A) or B) and the aluminoxane compounds in such amounts that the atomic ratio of aluminum from the aluminoxane compounds including aluminum alkyl still present to the transition metal from the metallocene complex (A) is in the range from 1:1 to 2000:1, preferably from 10:1 to 500:1 and in particular in the range from 20:1 to 400:1. The atomic ratio of aluminum from the aluminoxane compounds including aluminum alkyl still present to the transition metal from the metallocene complex (B) is usually in the range from 1:1 to 2000:1, preferably from 10:1 to 500:1 and in particular in the range from 20:1 to 400:1.

A further class of suitable activating components (C) are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound and the transition metal from the metallocene complex (A) or (B) is usually in the range from 1:1 to 100:1, preferably from 10:1 to 50:1 and in particular in the range from 20:1 to 40:1. Preference is given to using a metallocene dialkyl compound (A) or (B), in particular a zirconocene dialkyl compound (A) or (B).

As strong, uncharged Lewis acids, preference is given to compounds of the general formula (XII)

$$M^{2D}X^{1D}X^{2D}X^{3D} \tag{XII}$$

where
$M^{2D}$ is an element of group 13 of the Periodic Table of the Elements, in particular B, Al or Ga, preferably B,
$X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Compounds of this type which are particularly useful as component (C) are boranes and boroxins such as trialkylborane, triarylborane or trimethylboroxin. Particular preference is given to using boranes which bear at least two perfluorinated aryl radicals. Particular preference is given to compounds of the general formula (XII) in which $X^{1D}$, $X^{2D}$ and $X^{3D}$ are identical, for example triphenylborane, tris(4-fluorophenyl)borane, tris(3,5-difluorophenyl)borane, tris(4-fluoromethyl-phenyl)borane, tris(pentafluorophenyl)borane, tris(tolyl)borane, tris(3,5-dimethylphenyl)borane, tris(3,5-difluorophenyl)borane or tris(3,4,5 trifluorophenyl)borane. Preference is given to using tris(pentafluorophenyl)borane.

Suitable compounds (C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis-(pentafluorophenyl)methanol and 4-hydroxy-2,2',3,3',4',5,5',6,6'-nonafluorobiphenyl.

Examples of combinations of compounds of the formula (XII) with Brönsted acids are, in particular, trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol and triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (XII), $R^{1D}$ is an OH group, as, for example, in boronic acids and boronic acids, with boronic acids having perfluorinated aryl radicals, for example $(C_6F_5)_2BOH$, being worthy of particular mention.

Strong uncharged Lewis acids suitable as activating compounds (C) also include the reaction products of a boronic acid with two equivalents of a trialkylaluminum or the reaction products of a trialkylaluminum with two equivalents of an acidic fluorinated, in particular perfluorinated, carbon compound such as pentafluorophenol or bis(pentafluorophenyl)boronic acid.

Suitable ionic compounds having Lewis-acid cations include salt-like compounds of the cation of the general formula (XIII)

$$[((M^{3D})^{a+})Q_1 Q_2 \ldots Q_z]^{d+} \tag{XIII}$$

where
$M^{3D}$ is an element of groups 1 to 16 of the Periodic Table of the Elements,
$Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups,
a is an integer from 1 to 6 and
z is an integer from 0 to 5,
d corresponds to the difference a–z, but d is greater than or equal to 1.

Particularly useful cations are carbonium cations, oxonium cations and sulfonium cations and also cationic transition metal complexes, in particular the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl) borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane, or optionally a base, preferably an organic nitrogen-comprising base, for example an amine, an aniline derivative or a nitrogen heterocycle. In addition, a fourth compound which likewise reacts with the boron or aluminum compound, e.g. pentafluorophenol, can be added.

Ionic compounds having Brönsted acids as cations preferably likewise have noncoordinating counterions. As Brönsted acid, particular preference is given to protonated amine or aniline derivatives. Preferred cations are N,N-dimethylanilinium, N,N-dimethylcylohexylammonium and N,N-dimethylbenzylammonium and also derivatives of the latter too.

Compounds comprising anionic boron heterocycles as are described in WO 9736937 are also suitable as component C), in particular dimethylanilinium boratabenzene or trityl boratabenzene.

Preferred ionic compounds C) comprise borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluoro-phenylborate.

It is also possible for two or more borate anions to be joined to one another, as in the dianion $[(C_6F_5)_2B—C_6F_4—B(C_6F_5)_2]^{2-}$ or the borate anion can be bound via a bridge to a suitable functional group on the support surface.

Further suitable activating compounds (C) are listed in WO 00/31090.

The amount of strong, uncharged Lewis acids, ionic compounds having Lewis-acid cations or ionic compounds having Brönsted acids as cations is preferably from 0.1 to 20 equivalents, preferably from 1 to 10 equivalents and particularly preferably from 1 to 2 equivalents, based on the metallocene complex (A) or (B).

Suitable activating compounds (C) also include boron-aluminum compounds such as di[bis(pentafluorophenyl)boroxy]methylalane. Examples of such boron-aluminum compounds are those disclosed in WO 99/06414.

It is also possible to use mixtures of all the abovementioned activating compounds (C). Preferred mixtures comprise aluminoxanes, in particular methylaluminoxane, and an ionic compound, in particular one comprising the tetrakis(pentafluorophenyl)borateanion, and/or a strong uncharged Lewis acid, in particular tris(pentafluorophenyl)borane or a boroxin.

Both the complex (A) or (B) and the activating compounds (C) are preferably used in a solvent, preferably an aromatic hydrocarbon having from 6 to 20 carbon atoms, in particular xylenes, toluene, pentane, hexane, heptane or a mixture of these.

Furthermore, it is possible to use an activating compound (C) which can simultaneously be used as support (D). Such systems are obtained, for example, by treatment of an inorganic oxide with zirconium alkoxide and subsequent chlorination, e.g. by means of carbon tetrachloride. The preparation of such systems is described, for example, in WO 01/41920.

Combinations of the preferred embodiments of (C) with the preferred embodiments of (A) and/or (B) are particularly preferred.

Preference is given to using an aluminoxane as joint activator (C) for the catalyst components (A) and (B).

In addition, the reaction products of aluminum compounds of the formula (XII) with perfluorinated alcohols and phenols are particularly useful as joint activator (C).

For the metallocene complexes (A) and (B) to be able to be used in polymerization processes in the gas phase or in suspension, it is often advantageous to use the complexes in the form of a solid, i.e. for them to be applied to a solid support (D). Furthermore, the supported complexes have a high productivity. The complexes (A) and/or (B) can therefore also optionally be immobilized on an organic or inorganic support (D) and used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers functionalized with polar groups, for example copolymers of ethene and acrylic esters, acrolein or vinyl acetate.

Particular preference is given to a catalyst system comprising at least one metallocene complex (A), at least one metallocene complex (B), at least one activating compound (C) and at least one support component (D).

The preferred catalyst composition according to the invention comprises one or more support components. Both the catalyst component (A) and the catalyst component (B) can be supported, or only one of the two components can be supported. In a preferred embodiment, both components (A) and (B) are supported. The two components (A) and (B) can in this case have been applied to different supports or together to a joint support. The components (A) and (B) are preferably applied to a joint support in order to ensure a relative spatial proximity of the different catalyst centers and thus to achieve good mixing of the different polymers formed.

To prepare the catalyst systems of the invention, preference is given to immobilizing one of the components (A) and one of the components (B) and/or activator (C) on the support (D) by physisorption or by means of a chemical reaction, i.e. covalent bonding of the components, with reactive groups on the support surface.

The order in which support component D), complex (A), complex (B) and the activating compound (C) are combined is in principle immaterial. After the individual process steps, the various intermediates can be washed with suitable inert solvents such as aliphatic or aromatic hydrocarbons.

Metallocene complex (A), metallocene complex (B) and the activating compound (C) can be immobilized independently of one another, i.e. in succession or simultaneously. Thus, the support component (D) can firstly be brought into contact with the activating compound or compounds (C) or the support component (D) can firstly be brought into contact with the metallocene complex (A) and/or the metallocene complex (B). Preactivation of the complex A) by means of one or more activating compounds (C) prior to mixing with the support (D) is also possible. The metallocene complex (B) can, for example, be reacted simultaneously with the metallocene complex (A) with the activating compound (C), or can be separately activated by means of the latter. The preactivated complex (B) can be applied to the support before or after the preactivated complex (A). In one possible embodiment, the metallocene complex (A) and/or (B) can also be prepared in the presence of the support material. A further method of immobilization is prepolymerization of the catalyst system with or without prior application to a support.

Immobilization is generally carried out in an inert solvent which can be removed by filtration or evaporation after the immobilization. After the individual process steps, the solvent can be washed with suitable inert solvents such as aliphatic or aromatic hydrocarbons and dried. However, the use of the still moist, supported catalyst is also possible.

In a preferred method of preparing the supported catalyst system, at least one metallocene complex (A) and a metallocene complex (B) are together brought into contact with an activating compound (C) and subsequently mixed with the dehydrated or passivated support material (D). The solvent is then completely or partly removed from the preparation obtained in this way. The resulting supported catalyst system is preferably not dried, since the catalyst obtained in this way is less pyrophoric. The supported catalyst is preferably obtained as a free-flowing powder. A further preferred embodiment comprises firstly producing the activating compound (C) on the support component (D) and subsequently bringing this supported compound into contact with the complex (A) and the complex (B).

As support component (D), preference is given to using finely divided supports which can be any organic or inorganic solids. In particular, the support component (D) can be a porous support such as talc, a sheet silicate such as montmorillonite, mica, an inorganic oxide or a finely divided polymer powder (e.g. polyolefin or a polymer having polar function groups).

The support materials used preferably have a specific surface area in the range from 10 to 1000 m²/g, a pore volume in the range from 0.1 to 5 ml/g and a mean particle size of from 1 to 500 µm. Preference is given to supports having a specific surface area in the range from 50 to 700 m²/g, a pore volume in the range from 0.4 to 3.5 ml/g and a mean particle size in the range from 5 to 350 µm. Particular preference is given to supports having a specific surface area in the range from 200 to 550 m²/g, a pore volume in the range from 0.5 to 3.0 ml/g and a mean particle size of from 10 to 150 µm.

The metallocene complex (A) is preferably applied in such an amount that the concentration of the transition metal from the metallocene complex (A) in the finished catalyst system is from 1 to 200 µmol, preferably from 5 to 100 µmol and particularly preferably from 10 to 70 µmol, per g of support (D). The complex (B) is preferably applied in such an amount that the concentration of transition metal from the metallocene complex (B) in the finished catalyst system is from 1 to 200 µmol, preferably from 5 to 100 µmol and particularly preferably from 10 to 70 µmol, per g of support (D).

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of this solid and/or set the desired OH concentration on the surface. The support can also be treated chemically using customary desiccants such as metal alkyls, preferably aluminum alkyls, chlorosilanes or SiCl₄, or else methylaluminoxane. Appropriate treatment methods are described, for example, in WO 00/31090.

The inorganic support material can also be chemically modified. For example, treatment of silica gel with NH₄SiF₆ or other fluorinating agents leads to fluorination of the silica gel surface, or treatment of silica gels with silanes comprising nitrogen-, fluorine- or sulfur-comprising groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. It is also possible to use polymer blends.

Inorganic oxides suitable as support component (D) may be found among the oxides of the elements of groups 2, 3, 4, 5, 13, 14, 15 and 16 of the Periodic Table of the Elements. Examples of oxides preferred as supports comprise silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, AlPO₄, ZrO₂, TiO₂, B₂O₃ or mixtures thereof.

Further preferred inorganic support materials are inorganic halides such as MgCl₂ or carbonates such as Na₂CO₃, K₂CO₃, CaCO₃, MgCO₃, sulfates such as Na₂SO₄, Al₂(SO₄)₃, BaSO₄, nitrates such as KNO₃, Mg(NO₃)₂ or Al(NO₃)₃.

As solid support materials (D) for catalysts for olefin polymerization, preference is given to using silica gels since particles whose size and structure make them suitable as supports for olefin polymerization can be prepared from this material. Spray-dried silica gels, which are spherical agglomerates of smaller granular particles, known as primary particles, have been found to be particularly useful. The silica gels can be dried and/or calcined before use.

Further preferred supports (D) are hydrotalcites and calcined hydrotalcite. In mineralogy, hydrotalcite is a natural mineral having the ideal formula

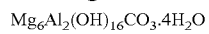

$$Mg_6Al_2(OH)_{16}CO_3 \cdot 4H_2O$$

whose structure is derived from that of brucite Mg(OH)₂. Brucite crystallizes in a sheet structure with the metal ions in octahedral holes between two layers of close-packed hydroxyl ions, with only every second layer of the octahedral holes being occupied. In hydrotalcite, some magnesium ions are replaced by aluminum ions, as a result of which the packet of layers gains a positive charge. This is compensated by the anions which are located together with water of crystallization in the layers in between.

Such sheet structures are found not only in magnesium-aluminum hydroxides, but also generally in mixed metal hydroxides of the general formula

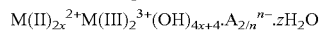

$$M(II)_{2x}^{2+}M(III)_2^{3+}(OH)_{4x+4} \cdot A_{2/n}^{n-} \cdot zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogencarbonate, nitrate, chloride, sulfate or B(OH)₄⁻ or polyoxo metal anions such as Mo₇O₂₄⁶⁻ or V₁₀O₂₈⁶⁻. However, a mixture of a plurality of such anions can also be present.

Accordingly, all such mixed metal hydroxides having a sheet structure should be regarded as hydrotalcites for the purposes of the present invention.

Calcined hydrotalcites can be prepared from hydrotalcites by calcination, i.e. heating, by means of which the desired hydroxyl group content can be set. In addition, the crystal structure also changes. The preparation of the calcined hydrotalcites used according to the invention is usually carried out at temperatures above 180° C. Preference is given to calcination for a period of from 3 to 24 hours at temperatures of from 250° C. to 1000° C. and in particular from 400° C. to 700° C. It is possible for air or inert gas to be passed over the solid or a vacuum to be applied during this step.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for one hour at 950° C. in a muffle furnace.

The calcined hydrotalcites used as component (D) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present.

Preferred calcined hydrotalcites (D) are mixed oxides in which M(II) is magnesium and M(III) is aluminum. Such aluminum-magnesium mixed oxides are obtainable from Condea Chemie GmbH (now Sasol Chemie), Hamburg, under the trade name Puralox Mg.

Preference is also given to calcined hydrotalcites in which the structural transformation is complete or virtually complete. Calcination, i.e. transformation of the structure, can be confirmed, for example, by means of X-ray diffraction patterns.

The hydrotalcites, calcined hydrotalcites or silica gels used are generally used as finely divided powders having a mean particle diameter D50 of from 5 to 200 μm, preferably from 10 to 150 μm, particularly preferably from 15 to 100 μm and in particular from 20 to 70 μm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and in particular from 100 to 600 m$^2$/g. The metallocene complex (A) or (B) is preferably applied in such an amount that the concentration of the transition metal from the metallocene complex (A) or (B) in the finished catalyst system is from 1 to 100 μmol, preferably from 5 to 80 μmol and particularly preferably from 10 to 60 μmol, per g of support (D).

The catalyst system can further comprise, as additional component (E), a metal compound of the general formula (XX),

$$M^G(R^{1G})_{r^G}(R^{2G})_{s^G}(R^{3G})_{t^G} \quad (XX)$$

where
$M^G$ is Li, Na, K, Be, Mg, Ca, Sr, Ba, boron, aluminum, gallium, indium, thallium, zinc, in particular Li, Na, K, Mg, boron, aluminum or Zn,
$R^{1G}$ is hydrogen, $C_1$-$C_{10}$-alkyl, $C_6$-$C_{15}$-aryl, alkylaryl or arylalkyl each having from 1 to 10 carbon atoms in the alkyl radical and from 6 to 20 carbon atoms in the aryl radical,
$R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl radical and from 6 to 20 carbon atoms in the aryl radical, or alkoxy comprising $C_1$-$C_{10}$-alkyl or $C_6$-$C_{15}$-aryl,
$r^G$ is an integer from 1 to 3
and
$s^G$ and $t^G$ are integers from 0 to 2, with the sum $r^G+s^G+t^G$ corresponding to the valence of $M^G$,
where the component (E) is usually not identical to the component (C). It is also possible to use mixtures of various metal compounds of the formula (XX).

Among the metal compounds of the formula (XX), preference is given to those in which
$M^G$ is lithium, magnesium, boron or aluminum and
$R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

If a metal compound (E) is used, it is preferably present in the catalyst system in such an amount that the molar ratio of $M^G$ from formula (XX) to the sum of the transition metals from the metallocene complex (A) and the metallocene complex (B) is from 3000:1 to 0.1:1, preferably from 800:1 to 0.2:1 and particularly preferably from 100:1 to 1:1.

In general, the metal compound (E) of the general formula (XX) is used as constituent of a catalyst system for the polymerization or copolymerization of olefins. Here, the metal compound (E) can be used, for example, for preparing a catalyst solid comprising the support (D) and/or be added during or shortly before the polymerization. The metal compounds (E) used can be identical or different. It is also possible, particularly when the catalyst solid does not comprise any activating component (C), for the catalyst system to comprise, in addition to the catalyst solid, one or more activating compounds (C) which are identical to or different from any compounds (E) present in the catalyst solid.

The component E) can likewise be reacted in any order with the components (A), (B) and optionally (C) and (D). The component (A) can, for example, be brought into contact with the component or components (C) and/or (D) either before or after being brought into contact with the olefins to be polymerized. Preactivation by means of one or more components (C) prior to mixing with the olefin and further addition of the same or other components (C) and/or (D) after bringing this mixture into contact with the olefin is also possible. Preactivation is generally carried out at temperatures of 10-100° C., preferably 20-80° C.

In another preferred embodiment, a catalyst solid is prepared as described above from the components (A), (B), (C) and (D) and this is brought into contact with the component (E) during, at the beginning of or shortly before the polymerization. Preference is given to firstly bringing (E) into contact with the α-olefin to be polymerized and subsequently adding the catalyst solid comprising the components (A), (B), (C) and (D) as described above.

In a further preferred embodiment, the support (D) is firstly brought into contact with the component (E), and the components (A) and (B) and any further activator (C) are then dealt with as above.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modified component, an antistatic or a suitable inert compound such as a wax or oil can be added as additive during or after the preparation of the catalyst system. The molar ratio of additives to the sum of metallocene complex (A) and metallocene complex (B) is usually from 1:1000 to 1000:1, preferably from 1:5 to 20:1.

The catalyst composition of the invention or the catalyst system is suitable for the preparation of the polyethylene of the invention which has advantageous use and processing properties.

To prepare the polyethylene of the invention, ethylene is polymerized with α-olefins having from 3 to 12 carbon atoms as described above.

In the copolymerization process of the invention, ethylene is polymerized with α-olefins having from 3 to 12 carbon atoms. Preferred α-olefins are linear or branched $C_2$-$C_{10}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene. Particularly preferred α-olefins are $C_4$-$C_{10}$-1-alkenes, in particular linear $C_6$-$C_8$-1-alkenes. It is also possible to polymerize mixtures of various α-olefins. Preference is given to polymerizing at least one α-olefin selected from the group consisting of ethene, propene, 1-butene, 1-pentene, 1-hexene, 1-heptene, 1-octene and 1-decene. Preference is given to using monomer mixtures comprising at least 50 mol % of ethene.

The process of the invention for the polymerization of ethylene with α-olefins can be carried out using all industrially known polymerization processes at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. In the case of suspension polymerizations, the polymerization is usually carried out in a suspension medium, preferably in an inert hydrocarbon, such as isobutane, or a mixture of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out at from 30 to 125° C. at pressures of from 1 to 50 bar.

Among the polymerization processes mentioned, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. A parallel reactor arrangement using two or more identical or different processes is also possible. Furthermore, molar mass regulators, for example hydrogen, or customary additives such as antistatics can also be used in the polymerizations.

The polymerization is preferably carried out in a single reactor, in particular in a gas-phase reactor. The polyethylene of the invention is obtained in the polymerization of ethylene with α-olefins having from 3 to 10 carbon atoms as a result of the catalyst of the invention. The polyethylene powder obtained directly from the reactor has a very high homogeneity, so that, unlike the case of cascade processes, subsequent extrusion is not necessary to obtain a homogeneous product.

The production of polymer blends by intimate mixing of individual components or by melt extrusion in an extruder or kneader (cf., for example "Polymer Blends" in Ullmann's Encyclopedia of Industrial Chemistry, 6th Edition, 1998, Electronic Release) is often accompanied by particular difficulties. The melt viscosities of the high and low molecular weight components of a bimodal polyethylene blend are extremely different. While the low molecular weight component becomes quite fluid at the customary temperatures for producing the blends of about 190-210° C., the high molecular weight component is only softened ('lentil soup'). Homogeneous mixing of the two components is therefore very difficult. In addition, it is known that the high molecular weight component can easily be damaged by thermal stress and by shear forces in the extruder, so that the properties of the blend deteriorate. The quality of mixing of such polyethylene blends is therefore often unsatisfactory.

The quality of mixing of the polyethylene powder obtained directly from the reactor can be tested by assessing thin slices ("microtome sections") of a sample under an optical microscope. Inhomogeneities show up in the form of specks or "white spots". The specks or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 μm, cause stress cracking and result in brittle failure of components. The better the quality of mixing of a polymer, the fewer and smaller are these inclusions. The quality of mixing of a polymer is determined quantitatively in accordance with ISO 13949. The measurement method provides for a microtome section to be produced from a sample of the polymer, the number and size of these exclusions are counted/measured, and a grade for the quality of mixing of the polymer is assigned according to a set-down evaluation scheme.

The preparation of the polyethylene of the invention directly in the reactor reduces the energy consumption, requires no subsequent blending processes and makes simple control of the molecular weight distributions and the molecular weight fractions of the various polymers possible. In addition, good mixing of the polyethylene is achieved.

The following examples illustrate the invention without restricting its scope.

The measured values described were determined in the following way:

NMR samples were dispensed under inert gas and, if appropriate, flame sealed. The solvent signals served as internal standard in the $^1$H- and $^{13}$C-NMR spectra, and the chemical shifts were then converted into chemical shifts relative to TMS.

The branches/1000 carbon atoms was determined by means of $^{13}$C-NMR as described by James C. Randall, JMS-REV. Macromol. Chem. Phys., C29 (2&3), 201-317 (1989), and are based on the total $CH_3$ group content/1000 carbon atoms including end groups. The side chains larger than $CH_3$/1000 carbon atoms is determined likewise (excluding end groups).

The content of internal trans double bonds —CH═CH— per 1000 carbon atoms, hereinafter referred to as trans vinyl groups, is determined in accordance with ASTM D 6248-98.

The density [g/cm3] was determined in accordance with ISO 1183.

The determination of the molar mass distributions and the means $M_n$, $M_w$ and $M_w/M_n$ derived therefrom was carried out by means of high-temperature gel permeation chromatography using a method based on DIN 55672 on a WATERS 150 C with the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 μl injection volume, temperature: 135° C., calibration using PE standards. Evaluation was carried out using WIN-GPC.

For the purposes of the present invention, the expression "MI" stands, in a known manner, for "melt index" and is always determined at 190° C. under a load of 2.16 kg (190° C./2.16 kg) in accordance with ISO 1133.

The spiral test was carried out on a Demag ET100-310 using a closure force of 100 t and a 3 mm die, measured at a melt temperature of 230° C., an injection pressure of 1000 bar, a screw speed of 90 mm/s, a mold temperature of 30° C. and a wall thickness of 2 mm.

The specimens for the gloss measurement were produced on an Engel injection-molding machine ES 330/80 HL using a screw diameter of 30 mm and an injection pressure of 2200 bar. The roller temperature was 225° C., the injection velocity was 50 mm/s, the hold time was 20 s, the cooling time was 30 s, the hold pressure was 687 bar, the screw speed was 116 rpm. The specimen had the following dimensions: 5.8 cm×5.8 cm×1 mm.

The haze was measured in accordance with ASTM D 1003-00 on a BYK Gardener Haze Guard Plus Device on at least 5 plates having a size of 10×10 cm and a thickness of 1 mm.

The impact resistance determined as instrument falling weight impact test at −20° C. is carried out in accordance with ISO 6603.

Abbreviations in the following table:
Cat. catalyst
T(poly) temperature of the polymerization
$M_w$ weight average molar mass
$M_n$ number average molar mass
Density polymer density
Prod. productivity of the catalyst in g of polymer obtained per g of catalyst used per hour
$CH_3$/1000 C is based on the total content of $CH_3$ groups/1000 carbon atoms (including end groups)
t-vinyl/1000 C is based on the content of internal trans double bonds per 1000 carbon atoms
Polymer ex. means polymer from example
Preparation of the Individual Components Bisindenylzirconium dichloride and ethylenebis(tetrahydroindenyl)zirconium dichloride is obtainable from Crompton.
Pretreatment of Support XPO-2107, viz. a spray-dried silica gel from Grace, was baked at 600° C. for 6 hours.

EXAMPLE 1

Preparation of the Mixed Catalyst System

A mixture of 39.2 g of bisindenylzirconium dichloride and 51.2 g of ethylenebis(tetrahydroindenyl)-zirconium dichloride was dissolved in 5.2 l of MAO solution in toluene (4.75 M in toluene, Albermarle) and stirred for 60 minutes. The solution was sprayed onto 4 g of silica gel (XPO 2107, calcined at 600° C. for 6 hours) over a period of 30 minutes while stirring. The lines were rinsed with 0.5 l of toluene. After stirring at room temperature for a further hour, the catalyst was packaged. 9.45 kg of the catalyst system were obtained. The residual moisture content was 44.7% by weight based on the finished catalyst (based on the total weight and calculated on the basis of total application of all the components to the support), the Al content was 6.1 g/100 g of finished catalyst and the Zr content was 0.23 g/100 g of finished catalyst.
Polymerization An ethylene-hexene copolymer was prepared at a reactor pressure of 20 bar and a reactor temperature of 95° C. using the catalyst system from example 1 in a continuously operated gas-phase fluidized-bed reactor having an output of 30.1 kg of product per hour. Ethylene was fed into the reactor at a rate of 35.5 kg per hour, and 177 g of 1-hexene per hour and 25 l of hydrogen per hour were introduced into the reaction. In addition, 4.8 kg of propane per hour, 0.32 kg of nitrogen per hour, 0.5 g of triisobutylaluminum per hour and 0.22 g of Costelan AS100 as a solution in heptane per hour were metered in. The supported catalyst system from example 1 was metered into the reactor as a solid in an amount of 10.78 g per hour. The properties of the polymers obtained are summarized in table 1.

COMPARATIVE EXAMPLE 1

A Ziegler catalyst as described in EP-A-739937 was used for the polymerization of ethylene with 1-butene in a suspension cascade reactor. A mixture of ethylene and hydrogen only was polymerized in the 1st reactor of the cascade, and a mixture of ethylene/1-butene comprising 0.8% by weight of 1-butene was copolymerized in the 2nd reactor. The product data are shown in table 1.

TABLE 1

| Cat. from ex. | Prod. [g/g] | MI [g/10 min] | $M_w$ [g/mol] | $M_w/M_n$ | Density [g/cm$^3$] | CH3/ 1000 C. | t-Vinyl/ 1000 C. |
|---|---|---|---|---|---|---|---|
| 1 | 2800 | 3.4 | 97 500 | 3.9 | 0.950 | 1.3 | 0.28 |
| C1 |  | 1.9 | 116 300 | 10 | 0.953 | 1 | 0.02 |

The polymer powder was in each case homogenized and pelletized using a twin-screw extruder (Werner & Pfleiderer ZSK 40 with the screw combination 54B). The processing temperature was 220° C., the rotational speed of the screw was 300 revolutions per minute at a maximum throughput of 80 kg per hour. 1500 ppm of Irganox B215 were mixed into the polymer powder to stabilize it.

The polymer powder was subjected to the spiral test and a further part was processed to give plates for the mechanical and optical tests.

TABLE 2

Properties of the molding composition

| Example | 1 | C1 |
|---|---|---|
| Spiral length, 230° C. [cm] | 41 | 36* |
| Haze [%] | 73.00 | 94.20 |
| Impact (−20° C.) [J] | 13.54 | 11.21 |
| Impact (−30° C.) [J] | 12.19 | 10.92 |

*C1 was measured under the same conditions but at a melt temperature of 250° C.

The polyethylene prepared using the catalyst system of the invention displays good flow combined with good optics.

The invention claimed is:

1. A monomodal molding composition comprising a polymer of ethylene, wherein the monomodal molding composition further comprises a density ranging from 0.940 to 0.96 g/cm$^3$, a MI ranging from 0.5 to 10 g/10 min, a polydispersity $M_w/M_n$ ranging from 3.2 to 9, a branches/1000 carbon atoms ranging from 0.1 to 10, a CDBI ranging from 10% to 45%, and a weight average molar mass $M_w$ ranging from 50,000 g/mol to 150,000 g/mol.

2. The monomodal molding composition according to claim 1, wherein the branches/1000 carbon atoms ranges from 0.2 to 5.

3. An injected-molded shaped body comprising a monomodal molding composition comprising a polymer of ethylene, wherein the monomodal molding composition further comprises a density ranging from 0.940 to 0.96 g/cm$^3$, a MI ranging from 0.5 to 10 g/10 min, a polydispersity $M_w/M_n$ ranging from 3.2 to 9, a branches/1000 carbon atoms ranging from 0.1 to 10, a CDBI ranging from 10% to 45%, and a weight average molar mass $M_w$ ranging from 50,000 g/mol to 150,000 g/mol.

4. The injection-molded shaped body according to claim 3, wherein the injection-molded shaped body comprises a haze of less than 80% in accordance with ASTM D 1003-00.

5. The injection-molded shaped body according to claim 3, wherein the injection-molded shaped body is in a form of a screw closure or pipe fitting.

6. A screw closure comprising a monomodal molding composition comprising a polymer of ethylene, wherein the monomodal molding composition further comprises a density ranging from 0.940 to 0.96 g/cm$^3$, a MI ranging from 0.5 to 10 g/10 min, a polydispersity $M_w/M_n$ ranging from 3.2 to 9, a branches/1000 carbon atoms ranging from 0.1 to 10, a CDBI ranging from 10% to 45%, and a weight average molar mass $M_w$ ranging from 50,000 g/mol to 150,000 g/mol.

7. The monomodal molding composition according to claim 1, wherein the weight average molar mass $M_w$ ranges from 70,000 g/mol to 120,000 g/mol.

8. The monomodal molding composition according to claim 1, wherein the weight average molar mass $M_w$ ranges from 80,000 g/mol to 110,000 g/mol.

9. The injection-molded shaped body according to claim 3, wherein the weight average molar mass $M_w$ ranges from 70,000 g/mol to 120,000 g/mol.

10. The injection-molded shaped body according to claim 3, wherein the weight average molar mass $M_w$ ranges from 80,000 g/mol to 110,000 g/mol.

11. The screw closure according to claim 6, wherein the weight average molar mass $M_w$ ranges from 70,000 g/mol to 120,000 g/mol.

12. The screw closure according to claim 6, wherein the weight average molar mass $M_w$ ranges from 80,000 g/mol to 110,000 g/mol.

* * * * *